3,360,332
MIXED-CATION PHOSPHATE GLASSES
Robert J. Fuchs and Charles W. Lutz, Clark, N.J., assignors to FMC Corporation, New York, N.Y., a corporation of Delaware
No Drawing. Filed Feb. 15, 1965, Ser. No. 432,890
4 Claims. (Cl. 23—106)

This is a continuation-in-part of patent application Ser. No. 182,870, filed Mar. 27, 1962.

The present invention relates to a method for producing polyphosphate glasses having both metal-corrosion inhibiting properties and calcium sequestering properties when applied in aqueous solutions and more particularly to the process of producing these glasses when they contain mixed cations such as sodium, calcium and aluminum.

Phosphate glasses are currently used in aqueous solutions to inhibit corrosion of metals in contact therewith and to inhibit hard water scale. The polyphosphates perform by sequestering the metal ions present in an aqueous system in the form of soluble complexes of the offending ions, thereby preventing them from forming scale on metal surfaces in contact with the aqueous system.

These glasses are produced by condensing molecules of orthophosphoric acid salts to form long-chained molecules having P—O—P bonds. The condensation is carried out by driving off molecular water at high temperatures from the appropriate orthophosphate salts. The polyphosphate glasses normally are produced from sodium salts of phosphoric acid and contain about 45 to 50 mole percent $P_2O_5$, e.g. sodium hexametaphosphate.

It has been the custom to replace portions of the sodium cations with other cations such as calcium and aluminum in order to obtain controlled dissolving rates. The dissolving rates are important because water normally is passed over the polyphosphate glass and it is desirable to dissolve the minimum amount of glass necessary to effect the required water treatment. If the glass has too high a dissolving rate, more glass will be dissolved than is necessary and will be wasted. Conversely, too low a dissolving rate will result in not enough polyphosphate glass being dissolved to achieve the desired result.

Certain of these mixed cationic glasses which have these desirable dissolving rates are illustrated in patent application Ser. No. 182,870, filed on Mar. 27, 1962, in the name of Robert J. Fuchs, of which this application is a continuation-in-part. These glasses have from about 46.5 to about 48.5 mole percent $P_2O_5$, from about 35.5 to about 44.5 mole percent $Na_2O$, from about 1 to about 4.25 mole percent $Al_2O_3$, from about 4 to about 15 mole percent CaO, and have relatively low fusion temperatures of below about 1380° F.

One of the difficulties that has arisen in the manufacture of these mixed-cation glasses is that of obtaining both a homogeneous and relatively low viscosity precursor mixture which can be fed to a furnace and melted to produce the polyphosphate glasses. This problem is most serious because if the precursor mixture is too viscous it becomes difficult to pump to the furnace. Further, if the mixture is not homogeneous, it will stratify in the furnace because of the lack of mixing action in the furnace. Alternately, if the mixture contains undispersed lumps of one or more of the cationic additives, these normally will not be conveyed to the furnace since they settle and remain in the base of the mixing tank. This results in a precursor mixture being fed to the furnace which does not have the desired composition. If some of the lumps of cationic additives do enter the conveying means to the furnace, they frequently cause malfunction of the pump. In any event, the resultant polyphosphate glass mixture will not be uniformly dispersed or have the desired consistency.

The problem is aggravated further by the fact that relatively small variations in the amounts of these added cations, e.g. aluminum, greatly affect the physical properties of the resultant glass. Thus, even minor variations in the consistency of the precursor mixture, or the presence of small amounts of lumps therein, result in a serious change in the properties of the glassy phosphate product.

As a result, it has been desired to produce a relatively non-viscous, homogeneous, precursor mixture of mixed, cation, glass components suitable for conversion into a phosphate glass.

It is an object of the present invention to produce the above described homogeneous, non-viscous precursor mixture.

Other objects will be apparent from the following description.

We have found that a homogeneous mixture of phosphate salts containing sodium, calcium, and aluminum cations can be obtained by adding these cations to aqueous phosphoric acid (or acid phosphate) having an effective concentration of from about 50% to about 75% by weight phosphoric acid, in the following order: (1) adding a calcium salt or a calcium oxide or hydroxide and reacting same until the calcium additive is dissolved, (2) adding a sodium salt or a sodium oxide or hydroxide, and (3) finally, adding an aluminum salt or an aluminum oxide or hydroxide to the mixture after the desired reaction between the phosphoric acid and the sodium additive has ceased. In the preferred embodiment, alumina is added to the mixture as a smooth, aqueous slurry containing about 50% solids concentration.

It is most unexpected to find that the order of addition has such a vast effect on the viscosity and homogeneity of the mixture. Moreover, the order of addition of the ingredients materially affects gelling and insoluble lump formation in the mixture.

In carrying out the preparation of the present polyphosphate glasses, the inorganic salts, oxides, or hydroxides containing the suitable cations are added to the phosphoric acid or acid phosphate in the above defined order of addition. If salts are used, they should be those which provide volatile anions such as carbonates, etc.

After the metal compounds have been added in the amounts desired to produce the required metal to phosphorus ratio in the reaction mass, the precursor mixture is pumped to a furnace where it is heated to its fusion temperature to obtain a clear viscous molten mass. The molten mass is then rapidly chilled by well-known means. For example, the molten mass might be poured onto cooled surfaces such as water cooled pans or trays. The solidified mass is then crushed or ground to a desired size and the product packed in air-tight containers.

The present polyphosphate glasses are employed in amounts of about 1 part to about 125 parts per million of solution. At these concentrations, the polyphosphate glasses inhibit the corrosion of metal which is in contact with the solution. In addition, because of their sequestering action, the polyphosphate glasses inhibit calcium scale formation on metal surfaces which are immersed in the solution. These polyphosphate glasses also are effective in inhibiting the red color which is found in some waters due to high concentrations of iron. It has been found that the polyphosphate glasses at these concentrations are effective in inhibiting the iron from interfering in chemical treating operations and other applications.

The glasses which are made up in accordance with this invention are those having from about 45 to about 50 mole percent $P_2O_5$. The preferred glasses have from about 46.5 to about 48.5 mole percent of $P_2O_5$, from about 35.5 to about 44.5 mole percent of $Na_2O$, from about 1 to about 4.25 mole percent of $Al_2O_3$, and from about 4 to about 15 mole percent CaO. These compositions have relatively low fusion temperatures, normally below about 1380° F., and have a "dissolving rate" of between 25 and 125 milligrams per liter.

The "dissolving rate" is calculated by placing 100 g. of the glassy polyphosphate having a particle size of between 8 and 20 mesh in a liter of water 20° C. The mixture is stirred for 10 minutes at 500 r.p.m. with a glass, paddle-type, four-blade stirrer, maintained within one-half inch of the base of the vessel. An aliquot of the filtrate is then analyzed for $P_2O_5$ content by the method of Martin and Doty, Anal. Chem., vol. 21, page 960 (1949). Glasses which are dissolved in the amount of about 25 to 125 parts per million, i.e., milligrams of polyphosphate glass, are considered acceptable. The term "dissolving rate," as employed herein refers to the above test method for determining the rate at which the phosphate glasses dissolve in water.

In general, the temperature of the precursor mixture being made up depends upon the concentration of phosphoric acid used. At room temperatures, the use of phosphoric acid in concentrations above about 60% by weight is not suitable for make up of the precursor mixture because of the high viscosity obtained. However, when the make up is conducted at about 100° C., the concentration of phosphoric acid can be as high as about 75% by weight. For convenience in the plant, temperatures of from about 70–80° C. are used in the make up, permitting phosphoric acid concentrations of about 60% to about 75% by weight to be used. Phosphoric acid concentrations below 50% can be employed but are not desired because excess water has to be evaporated in the furnace and makes for costly and difficult furnace operation.

In order to illustrate the effect that phosphoric acid concentrations have on the viscosity of the precursor mixture, viscosity measurements were taken of typical precursor glass mixtures prepared with different concentrations of phosphoric acid. The resultant glass from the precursor mixtures contained, by weight, 4% $Al_2O_3$, 6% CaO, 23% $Na_2O$, and 67% $P_2O_5$. The above mixtures were prepared in the laboratory by mixing 123 g. of 75% phosphoric acid, 10.72 g. of calcium carbonate, 39.33 g. of sodium carbonate, and 6.25 g. of $Al_2O_3$, in that order. The above mixtures were repeated in all cases, except that varying amounts of water were first added to the 123 g. of 75% phosphoric acid to illustrate the effect of acid concentration on viscosity. The viscosity of the solutions were determined at 100° C. and 25° C. and are reported below in Table I.

TABLE I

| Percent By Weight $H_3PO_4$ in Precursor Mixture | Viscosity (centipoises) at— | |
|---|---|---|
| | 100° C. | 25° C. |
| 44 | 28 | 32 |
| 60 | 36 | 112 |
| 67 | 64 | 496 |
| 75 | 180 | Solid |

The following examples are given to illustrate the present invention and are not deemed to be limiting thereof.

EXAMPLE 1

*Run A.*—The precursor composition of a slowly soluble phosphate glass was made up containing, by weight, 4% $Al_2O_3$ (4 mole percent), 6% CaO (10.7 mole percent), 23% $Na_2O$ (37.8 mole percent), and 67% $P_2O_5$ (47.5 mole percent). The composition was made up by placing 154.7 g. of 60% by weight $H_3PO_4$ in a beaker and adding 10.72 g. of calcium carbonate with vigorous stirring. Thereafter, 39.33 g. of sodium carbonate was added with vigorous stirring until all $CO_2$ evolution had ceased. The final additive was 6.25 g. of $Al_2O_3 \cdot 3H_2O$. The mixture was maintained at a temperature of 75–80° C. during the addition of the reagents and was stirred vigorously throughout the additions. The viscosities of the mixtures were determined at temperatures of between 75–80° C. using a Brookfield Viscometer. The viscosity was determined prior to and after each addition. The results are shown in Table II.

*Run B.*—The composition described in Run A was made up in precisely the same manner except that the order of adding the reactants was varied as follows:

Mixture:                          Order of addition
1 ------------ $Na_2CO_3$, $CaCO_3$, then $Al_2O_3 \cdot 3H_2O$.
2 ------------ $Na_2CO_3$, $Al_2O_3 \cdot 3H_2O$, then $CaCO_3$.
3 ------------ $CaCO_3$, $Al_2O_3 \cdot 3H_2O$, then $Na_2CO_3$.
4 ------------ $Al_2O_3 \cdot 3H_2O$, $Na_2CO_3$, then $CaCO_3$.
5 ------------ $Al_2O_3 \cdot 3H_2O$, $CaCO_3$, then $Na_2CO_3$.

The viscosity of the slurries obtained by the different runs are given below in Table II.

TABLE II

| Order of Addition | Viscosities at 75–80° C. (centipoises) | | | | | |
|---|---|---|---|---|---|---|
| | Run A | Mixture 1 | Mixture 2 | Mixture 3 | Mixture 4 | Mixture 5 |
| Viscosity after: | | | | | | |
| 1st Component | 7 | 12 | 15 | 9 | 8 | 9 |
| 2d Component | 44 | 65 | 15 | 10 | 15 | 10 |
| 3d Compoennt | 47 | ¹ 85 | ² 250 | ³ 750 | ³ 570 | ³ 610 |

¹ Contains small lumps of $CaHPO_4$.
² Material melts heterogeneously.
³ Slurry tended to jell before all of last component was added.

As will be observed from the results of Table II, the addition of the ingredients in the order specified in Run A produced a slurry having the lowest viscosity and was free of any lumps of $CaHPO_4$ and melted homogeneously.

EXAMPLE 2

*Run A.*—The following mixed cation phosphate slurry was prepared as the precursor to the corresponding phosphate glass as follows. A cylindrical tank one-foot high and one-foot in diameter was equipped with 3 one-inch wide vertical baffles mounted equidistant on the inside walls and was used as the mixing tank. Agitation was carried out using a four-inch diameter turbo-type agitator mounted about three inches from the bottom of the tank and rotating at about 125 r.p.m. Sufficient heat was supplied by two electric immersion heaters to maintain the mixture at a temperature of from about 75–80° C. The slurry was made up by adding 15,090 g. of 60% phosphoric acid to the mixing tank followed by 1062 g. of calcium carbonate. After the mixing was complete and the calcium carbonate thoroughly dispersed, 3,910 g. of sodium carbonate were added. After the evolution of carbon dioxide was completed, 608 g. of $Al_2O_3 \cdot 3H_2O$ was added to the mixing tank in the form of a 50% aqueous slurry. The aqueous slurry of aluminum oxide was made up by separately adding water to the aluminum oxide, with mixing, until a homogeneous slurry having a 50% solids concentration was obtained containing no lumps or gritty particles. This $Al_2O_3$ slurry was then added to the mixing tank. The resultant slurry in the mixing tank was found to be uniform, smooth, and free-flowing.

*Run B.*—A second slurry was prepared in an identical manner and containing the same ingredients as Run A, except that the sodium carbonate constituent was added before the calcium carbonate. The resulting slurry in the mixing tank contained hard lumps of $CaHPO_4$ and $Al_2O_3 \cdot 3H_2O$. Further, the viscosity of this slurry was found to be several orders of magnitude greater than that obtained as set forth in Run A.

EXAMPLE 3

The following precursor glass mixtures were made up into smooth, free-flowing, non-settling slurries by the procedure set forth in Example 2, Run A. The compositions of the glasses are given in Table III in both mole percent and weight percent.

TABLE III

| Run | Composition | | | | | | | |
|---|---|---|---|---|---|---|---|---|
| | Weight Percent | | | | Mole Percent | | | |
| | $P_2O_5$ | $Na_2O$ | $Al_2O_3$ | CaO | $P_2O_5$ | $Na_2O$ | $Al_2O_3$ | CaO |
| 1 | 67 | 26.7 | 2.5 | 3.8 | 47.5 | 43.3 | 2.5 | 6.7 |
| 2 | 67 | 25.5 | 3 | 4.5 | 47.5 | 41.5 | 3 | 8 |
| 3 | 67 | 24.8 | 3.3 | 4.9 | 47.5 | 40.6 | 3.2 | 8.7 |
| 4 | 67 | 23 | 4 | 6 | 47.5 | 37.8 | 4 | 10.7 |
| 5 | 67 | 22.5 | 4.2 | 6.3 | 47.5 | 37.1 | 4.2 | 11.2 |
| 6 | 67 | 27.7 | 1.8 | 3.5 | 47.5 | 44.6 | 1.7 | 6.2 |
| 7 | 67 | 27 | 2 | 4 | 47.5 | 43.4 | 2 | 7.1 |
| 8 | 67 | 26.2 | 2.3 | 4.5 | 47.5 | 42.3 | 2.2 | 8 |
| 9 | 67 | 25.5 | 2.5 | 5 | 47.5 | 41.1 | 2.5 | 8.9 |
| 10 | 67 | 24.7 | 2.8 | 5.5 | 47.5 | 40 | 2.7 | 9.8 |
| 11 | 67 | 24 | 3 | 6 | 47.5 | 38.8 | 3 | 10.7 |
| 12 | 67 | 21 | 4 | 8 | 47.5 | 34.2 | 4 | 14.3 |
| 13 | 67 | 18 | 5 | 10 | 47.5 | 29.7 | 5 | 17.8 |
| 14 | 65 | 31.2 | 1.6 | 3.2 | 45.0 | 47.8 | 1.5 | 5.7 |
| 15 | 65 | 28.4 | 2.2 | 4.4 | 45.0 | 45.2 | 2.1 | 7.7 |
| 16 | 65 | 23 | 4 | 8 | 45.0 | 37.0 | 3.9 | 14.1 |
| 17 | 65 | 24 | 3 | 8 | 45.0 | 38.0 | 3.0 | 14.0 |
| 18 | 69 | 20 | 3 | 8 | 49.5 | 32.8 | 3.0 | 14.7 |

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In the process of producing phosphate glasses consisting essentially of $P_2O_5$, $Na_2O$, CaO and $Al_2O_3$ values and having $P_2O_5$ values of from about 45 to about 50 mole percent, wherein a precursor aqueous slurry containing said values is heated in a furnace to fusion temperatures to obtain clear, molten masses and said molten masses are rapidly chilled to obtain said phosphate glasses, the improvement which comprises making up said precursor aqueous slurry by adding calcium oxide values to an acidic phosphate having an effective concentration of from about 50 to about 75% by weight phosphoric acid, subsequently adding sodium oxide values to the phosphate mixture, and subsequently adding aluminum values to said phosphate mixture whereby a smooth, uniform, free-flowing, non-viscous mixture is produced as the precursor aqueous slurry of said phosphate glasses which can be readily pumped to said furnace.

2. Process of claim 1 wherein said $P_2O_5$ values are from about 46.5 to about 48.5 mole percent.

3. Process of claim 1 in which said aluminum values are added to the mixture in the form of a homogeneous aqueous mixture of alumina free of lumps and grit.

4. Process of claim 1 in which the mixture contains from about 46.5 to about 48.5 mole percent $P_2O_5$, from about 35.5 to about 44.5 mole percent $Na_2O$, from about 1 to about 4.25 mole percent $Al_2O_3$, and from about 4 to about 15 mole percent CaO.

References Cited

UNITED STATES PATENTS

| 2,370,472 | 2/1945 | King | 252—1 |
| 2,370,473 | 2/1945 | King | 210—23 |
| 2,539,305 | 1/1951 | Hatch | 210—23 |
| 2,574,047 | 11/1951 | Mackenzie | 252—109 |
| 3,043,772 | 7/1962 | Liddell | 210—57 |

OSCAR R. VERTIZ, *Primary Examiner.*

L. A. MARSH, *Assistant Examiner.*